United States Patent
Retter et al.

(10) Patent No.: US 6,934,874 B2
(45) Date of Patent: Aug. 23, 2005

(54) METHOD AND APPARATUS FOR ENSURING INTEGRITY OF TRANSMITTED DATA IN A DISTRIBUTED CONTROL SYSTEM

(75) Inventors: Jochen Retter, Wernau (DE); Anton Rink, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 438 days.

(21) Appl. No.: 09/780,608

(22) Filed: Feb. 12, 2001

(65) Prior Publication Data

US 2001/0020281 A1 Sep. 6, 2001

(30) Foreign Application Priority Data

Feb. 11, 2000 (DE) .......................................... 100 06 206

(51) Int. Cl.$^7$ ............................................... G06F 11/00
(52) U.S. Cl. .......................... 714/4; 714/777; 714/758; 714/18; 714/20
(58) Field of Search ............................ 714/4, 18, 20, 714/777, 757, 750, 758, 47, 48, 49, 50, 51

(56) References Cited

U.S. PATENT DOCUMENTS

| | | | |
|---|---|---|---|
| 4,734,687 A | | 3/1988 | Jones ........................... 340/715 |
| 5,436,837 A | * | 7/1995 | Gerstung et al. ............. 701/29 |
| 5,901,281 A | * | 5/1999 | Miyao et al. .................. 714/11 |
| 5,909,540 A | * | 6/1999 | Carter et al. .................... 714/4 |
| 6,067,586 A | | 5/2000 | Ziegler et al. ................. 710/18 |
| 6,546,508 B1 | * | 4/2003 | Sonderman et al. .......... 714/48 |
| 6,633,782 B1 | * | 10/2003 | Schleiss et al. ............... 700/26 |

FOREIGN PATENT DOCUMENTS

| | | |
|---|---|---|
| DE | 36 00 092 A1 | 7/1986 |
| DE | 41 14 999 A1 | 11/1992 |
| DE | 196 53 551 C1 | 2/1998 |
| DE | 197 43 463 A1 | 4/1999 |
| EP | 0 322 141 | 6/1989 |
| WO | WO 98/53374 | 11/1998 |

OTHER PUBLICATIONS

European Search Report (EPO Form 1507.0 dated May 7, 2001).

* cited by examiner

*Primary Examiner*—Nadeem Iqbal
*Assistant Examiner*—Timothy M. Bonura
(74) *Attorney, Agent, or Firm*—Crowell & Moring LLP

(57) ABSTRACT

An electronic control system has a plurality of mutually networked or communicating control units, with special, redundant safeguarding measures during transmission of a safety-related transmitted signal from a first control unit to a second control unit. The first control unit generates the transmitted signal and a second signal complementary thereto on different paths, and sends them to a memory, together with two additional signals which are significant for the paths. A third control unit reads out the transmitted signal and the second signal from the memory, and checks them, and, upon detection of an error, switches off the first control unit or, given correct signals, generates different types of test or safety signals and conducts them to a memory. The first control unit reads out the test or safety signals from the last-named memory and checks them and, upon detection of an error, switches itself off, or, given correct test or safety signals, feeds the transmitted signal and at least one prescribed selection of the test or safety signals to the second control unit.

12 Claims, 1 Drawing Sheet

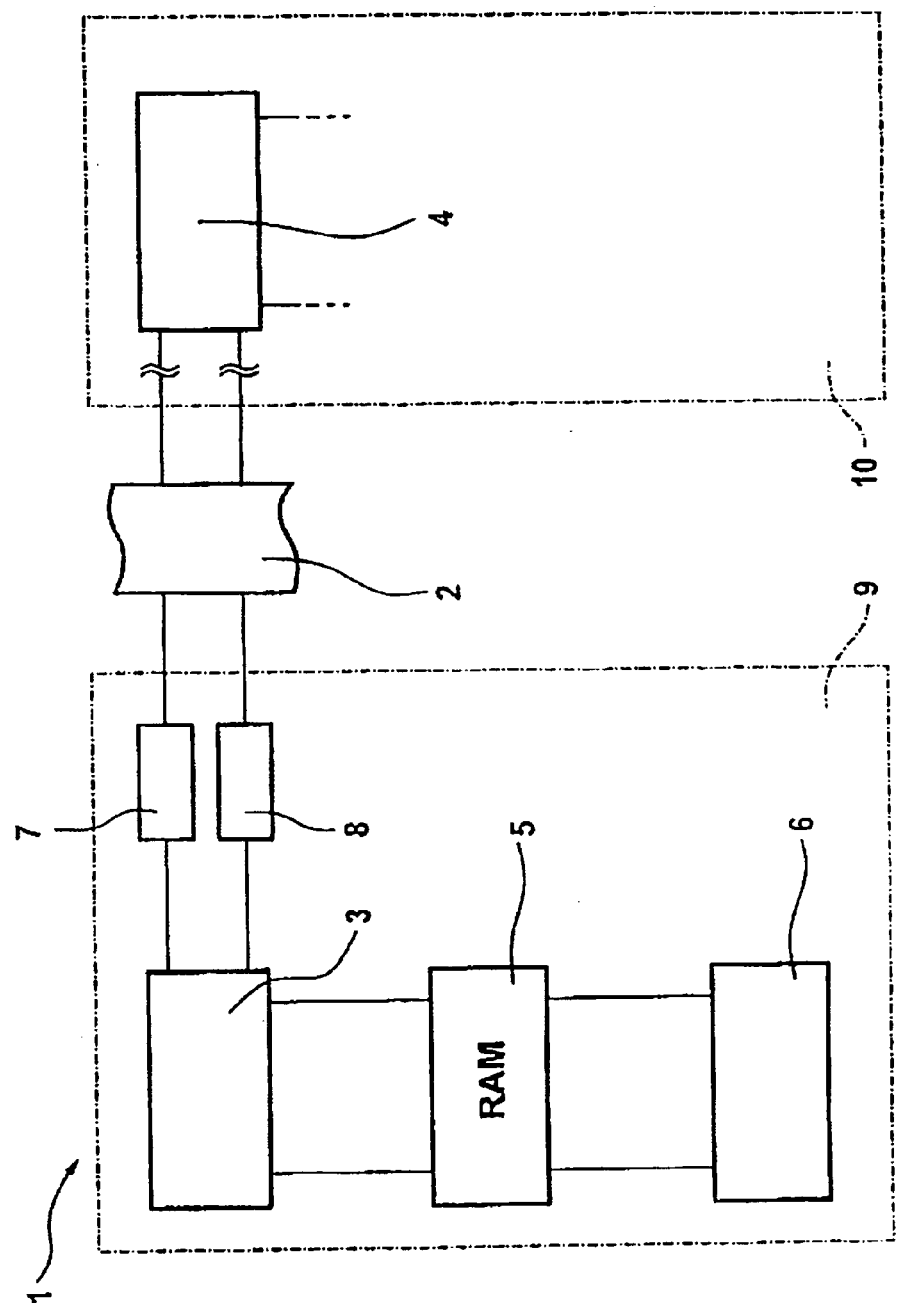

METHOD AND APPARATUS FOR ENSURING INTEGRITY OF TRANSMITTED DATA IN A DISTRIBUTED CONTROL SYSTEM

BACKGROUND AND SUMMARY OF THE INVENTION

This application claims the priority of German patent document 100 06 206.7, filed Feb. 11, 2000, the disclosure of which is expressly incorporated by reference herein.

The invention relates to an electronic control system having a plurality of mutually networked or communicating control units, in which safeguards are provided to avoid incorrect response of a second control unit during the transmission of a safety-related signal from a first control unit to the second control unit.

Modern motor vehicles typically include complicated control systems which, in some circumstances, have many control units for actuating subsystems of the motor vehicle.

In distributed control systems used in known vehicle drive control systems, a first control unit calculates a desired variable in a higher-level control function. The desired variable is then transmitted via a data bus to a third control unit, which uses a lower-level control function to control a device based on the desired variable, such that the desired variable is optimally set. The third control unit transmits an acknowledgment signal to the first control unit via a data bus.

For example, the control system can comprise an electronic engine controller and an electronic gearbox controller. In the event of a gear change, the gearbox controller transmits a signal to the engine controller as indicating a set point for the torque of the engine and, if appropriate, further set points for further parameters, for example the engine speed. This enables the engine controller to adopt operation of the engine to the gear change.

Control systems of this type must be secured against the generation and transmission of false signals in order to avoid the risk of serious malfunctions.

On the one hand, it is known in this context from International patent document WO 98/53374 to generate signals redundantly and, in the event of deviations between the redundantly determined results, to generate an error signal which has the effect of switching off the signal processing unit. On the other hand, WO 98/53374 also indicates a possibility of switching the control system to emergency operation upon detection of errors, so that the vehicle still remains ready for operation, although possibly at a reduced level of comfort.

One object of the present invention is to ensure particularly high operational reliability in a control system of the type mentioned previously.

This and other objects and advantages are achieved by the control system in which, according to the invention, during transmission of a safety-relevant transmitted signal from the first control unit to the second control unit, the first control unit generates the transmitted signal and a second signal complementary thereto on different paths (that is, in different modules), and sends them to a memory, together with two additional signals which are indicative of the paths;

a third control unit reads out the transmitted signal and the second signal from the memory, and checks them, and, upon detection of an error, switches off the first control unit or, given correct signals, generates different types of test or safety signals and conducts them to a memory; and the first control unit reads out the test or safety signals from the last-named memory and checks them and, upon detection of an error, switches itself off, or, given correct test or safety signals, feeds the transmitted signal and at least one prescribed selection of the test or safety signals to the second control unit.

The invention is based on the general idea that, before transmitting a safety-relevant signal to a second control unit, the first control unit cooperates with a third control unit for the purpose of checking the signal to be transmitted. The third control unit initially checks the function of the first control unit and, subsequently, the first control unit checks the function of the third control unit before the transmitted signal can be relayed to the second control unit. During this mutual checking, both the first and the third control units operate asymmetrically in a redundant fashion, the paths of the redundant signal generation also being checked.

Because the signals exchanged between the first and second control units are buffered in a memory, a delay which excludes undesired or parasitic instances of feedback between these control units occurs between the sending of a signal by one control unit and the reception of the signal at the other control unit.

In accordance with a particularly preferred embodiment of the invention, it is provided, furthermore, that the second control unit pays heed to the transmitted signal fed to it only when it has recognized the test or safety signals further fed as error free.

In addition or as an alternative, the safety of the system can be further increased by providing that the second control unit returns the received transmitted signal as acknowledgment to the first control unit. In this manner, the function of the second control unit is also necessarily checked by another control unit, so that, upon detection of an error, undesired control functions cannot be triggered. Alternatively, it is possible to transfer to an emergency operating mode or standby operating mode of the control system.

Moreover, it can be provided that, when transmitting the signals to the second control unit, the first control unit reads back the signals to be transmitted, which were first input in a buffer, such that an additional signal comparison is provided here and the first control unit can be switched off again upon detection of an error.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic block diagram of the electronic control system according to the invention, which control system preferably operates digitally.

DETAILED DESCRIPTION OF THE DRAWINGS

The electronic control system 1 illustrated in the drawing has a data bus 2 via which different control units are mutually networked. In the example illustrated, the aim is for a first electronic control unit 3 (which may be, for example, an automatic gearbox controller in a motor vehicle) to send to a second electronic control unit 4 (for example, an electronic engine controller of the motor vehicle) safety-relevant signals representing, for example, the set point of an engine torque which is to be set in the event of a gear change in the gearbox.

According to the invention, the first control unit 3 initially generates an appropriate set point signal 5 and a set point signal S* complementary thereof (for example bitwise), and feeds these signals to a memory 5. The set point signal S and the complementary set point signal S* are generated by means of different modules of the hardware or software of the first control unit 3—that is, on different paths. Also, additional signals Z, Z* are generated, indicating the path used in each case, and are likewise fed to the memory 5.

A third electronic control unit 6, combined with the first control unit 3, thereupon reads the signals S, S*, Z and Z* from the memory 5, in order to carry out various test operations.

On the one hand, the complementary nature of the signals S and S* can be checked, for example by adding these signals to one another in a bitwise fashion. If the bitwise addition then always leads to ZERO, the aforesaid bitwise complementary relationship is confirmed.

Furthermore, the value range of the signals S and S* (that is, whether the signals lie in a permissible and/or plausible range) can be checked.

Moreover, the additional signals Z and Z* can be checked for plausibility. For example, it can be provided that the paths used to generate the signals S and S* in the first control unit 3 must be varied in accordance with prescribed time intervals. As a result, the third control unit 6 can, with the aid of the signals Z and Z*, check the permissibility of the respective paths.

If the third control unit 6 establishes an error in the signals S, S*, Z and/or Z*, the first control unit 3 is switched off automatically. On the other hand, if the signals S, S*, Z and Z* are found to be error free, the third control unit 6 can calculate a parity signal (P or P*, respectively), in relation to the digital signals S and S*. The parity signal conveys how often the digital signals S and S* contain a digital ONE. These parity signals are stored at different locations in the memory 5.

In addition, the third control unit 6 can generate so-called toggle bits T and T* which can be complementary to one another in a prescribable way. These toggle bits are switched over at regular time intervals—for example, in each case after a prescribed number of pulses of a central clock generator (not illustrated) of the control system 1. These clock generator pulses can be fed to the control units via separate signal lines (not illustrated).

The toggle bits T and T* are also stored at different locations in the memory 5.

The first control unit 3 now reads out the parity signals P and P* as well as the toggle bits T and T* from the memory 5, and carries out various safety checks, for example an addition test and plausibility tests. If an error is established, the first control unit 3 switches off.

If the first control unit 3 detects the aforementioned signals as being error free, it relays the set point signal S, the parity signal P and the toggle bit T to a buffer 7 which acts as a data bus transmitting unit and puts the aforementioned signals onto the data bus 2, to be received by the second control unit 4.

The second control unit 4 pays heed to the set point signal S only when the transmitted parity signal P correctly conveys the parity of the signal S, and also the toggle bit T is present and/or plausible. If these conditions are not fulfilled completely, the set point signal S is not accepted by the second control unit 4.

In parallel with the transmission of the signals S, P and T to the second control unit 4, these signals are also fed by the data bus 2 to a further buffer 8, which operates as a data bus receiving unit and returns the received signals to the first control unit 3. In this way, the first control unit 3 can check the agreement of the signals set by it with signals returned directly via the data bus 2. If a difference occurs, the first control unit 3 switches off.

Moreover, after receiving the signals S, P and T, the second control unit 4 can return to the first control unit 3 an acknowledgment signal having a structure dependent on the aforementioned signals. The received signal S, for example, can be sent as the acknowledgment signal. Should the first control unit 3 recognize the acknowledgment signal as defective (that is, as not corresponding to the signals S, P and T), this is the same as saying that a communication error is present.

In this case, the control system 1 can be switched over, as required, to emergency operation.

After the control unit 3 has been switched off automatically, if appropriate, or after it has been switched over to emergency operation, the control system 1 can be reset to normal operation again as part of service measures.

The elements 3 and 5 to 8 can be designed or programmed as parts or regions of a separate processor 9. In particular, the control units 3 and 6 can also be implemented in a single control unit as different software modules.

The data bus 2 can be provided as a so-called CAN bus, and the memory 5 is preferably a RAM.

In summary, the invention creates a logic system for monitoring desired variables in distributed control systems, in which it is possible to check the desired variables independently of the application.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic control system having at least first, second and third mutually communicating control units and a memory, wherein for transmission of a control-related signal from the first control unit to the second control unit:

the first control unit generates the control-related signal and a second signal complementary thereto on different paths and, sends them to the memory, together with two additional signals, which are indicative of the respective different paths;

the third control unit reads out the control-related and complementary signals and the additional signals from the memory, and checks them, and i) upon detection of an error in said signals, switches off the first control unit or, ii) if said signals are correct, generates different types of test or safety signals and sends them to the memory; and the first control unit reads out the test or safety signals from the memory and checks them and, i) upon detection of an error in said test or safety related signals, switches itself off, or ii) if the test or safety signals are correct, emits the control-related signal and at least a prescribed selection of the test or safety signals, for transmission to the second control unit.

2. The control system according to claim 1, wherein the second control unit tests the selection of test or safety signals and disregards the control-related signal upon detection of an error in the selection of test or safety signals.

3. The control system according to claim 1, wherein the second control unit processes or obeys the control-related signal if the selection of the test or safety signals is correct.

4. The control system according to claim 1, wherein the second control unit returns an acknowledgment signal that is correlated to the received control-related signal, to the first control unit, which checks the acknowledgement signal and i) upon detection of an error in the acknowledgement signal, switches the control system to an emergency operating or standby operating mode, and ii) if the acknowledgement signal is correct, causes the control-related signal to be processed further.

5. The control system according to claim 1, wherein:
   if the test or safety signals are correct, the first control unit relays the control-related signal and the selection of the test or safety signals to the second control unit via a data bus transmitter, which data bus transmitter returns the control-related signal and the selection of the test or safety signals to the second control unit and to the first control unit, respectively; and
   the first control unit compares the control-related and the returned signals and turns itself off in the event of signal deviations.

6. The control system according to claim 1, wherein the control-related signal and the second signal are complementary to one another in a bitwise fashion.

7. A method for controlling transmission of control-related signals between first and second control units in a distributed control system that includes said first and second control units, a memory and at least a third control unit, all of which communicate with each other via a communications network, said method comprising:
   said first control unit generating a control-related signal and a second signal complementary thereto on different paths and, sending them to the memory, together with two additional signals, which are indicative of the respective different paths;
   said third control unit reading out the control-related and complementary signals and the additional signals from the memory, and checking them, and i) upon detection of an error in said signals, switching off the first control unit or, ii) if the signals are correct, generating different types of test or safety signals and sending them to the memory; and
   said first control unit reading out the test or safety signals from the memory and checking them and, i) upon detection of an error in said test or safety signals, switching itself off, or n) if the test or safety signals are correct, emitting the control-related signal and at least a prescribed selection of the test or safety signals, for transmission to the second control unit.

8. The control system according to claim 7, wherein the second control unit tests the selection of test or safety signals and disregards the control-related signal upon detection of an error in the selection of test or safety signals.

9. The control system according to claim 7, wherein the second control unit processes or obeys the control-related signal if the selection of the test or safety signals is correct.

10. The control system according to claim 7, wherein the second control unit returns an acknowledgment signal that is correlated to the received control-related signal, to the first control unit, which checks the acknowledgement signal and i) upon detection of an error in the acknowledgement signal, switches the control system to an emergency operating or standby operating mode, and ii) if the acknowledgement signal is correct, causes the control-related signal to be processed further.

11. The control system according to claim 7, wherein:
   if the test or safety signals are correct, the first control unit relays the control-related signal and the selection of the test or safety signals to the second control unit via a data bus transmitter, which data bus transmitter returns the control related signal and the selection of the test or safety signals to the second control unit and to the first control unit, respectively; and
   the first control unit compares the control-related and the returned signals and turns itself off in the event of signal deviations.

12. The control system according to claim 7, wherein the control-related signal and the second signal are complementary to one another in a bitwise fashion.

* * * * *